May 24, 1949.  F. R. HARRIS  2,470,850
WATER LEVEL INDICATOR FOR FLOATING DRY DOCKS
Filed Nov. 21, 1945  3 Sheets-Sheet 1
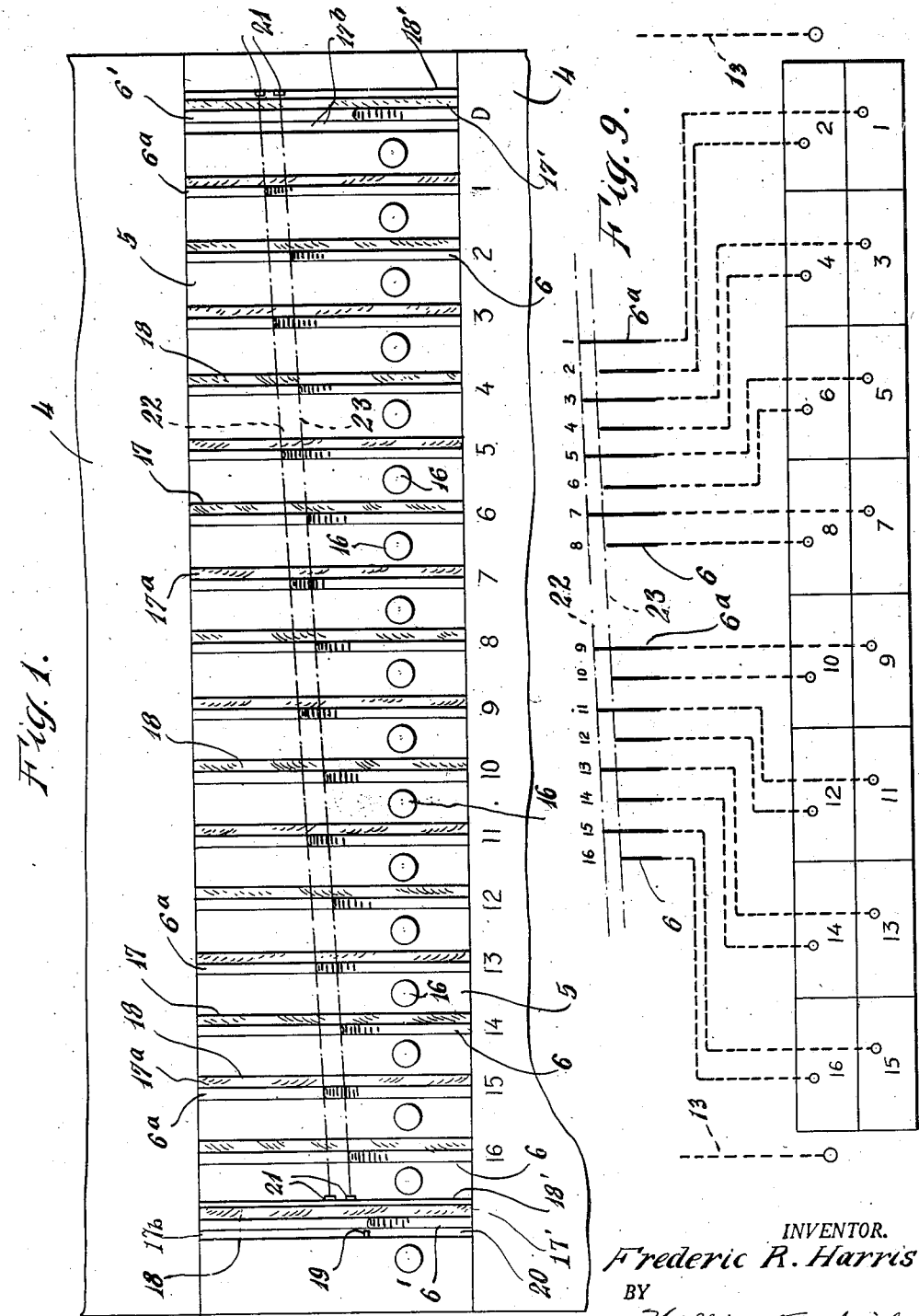
INVENTOR.
Frederic R. Harris
BY
William F. Nickel
ATTORNEY

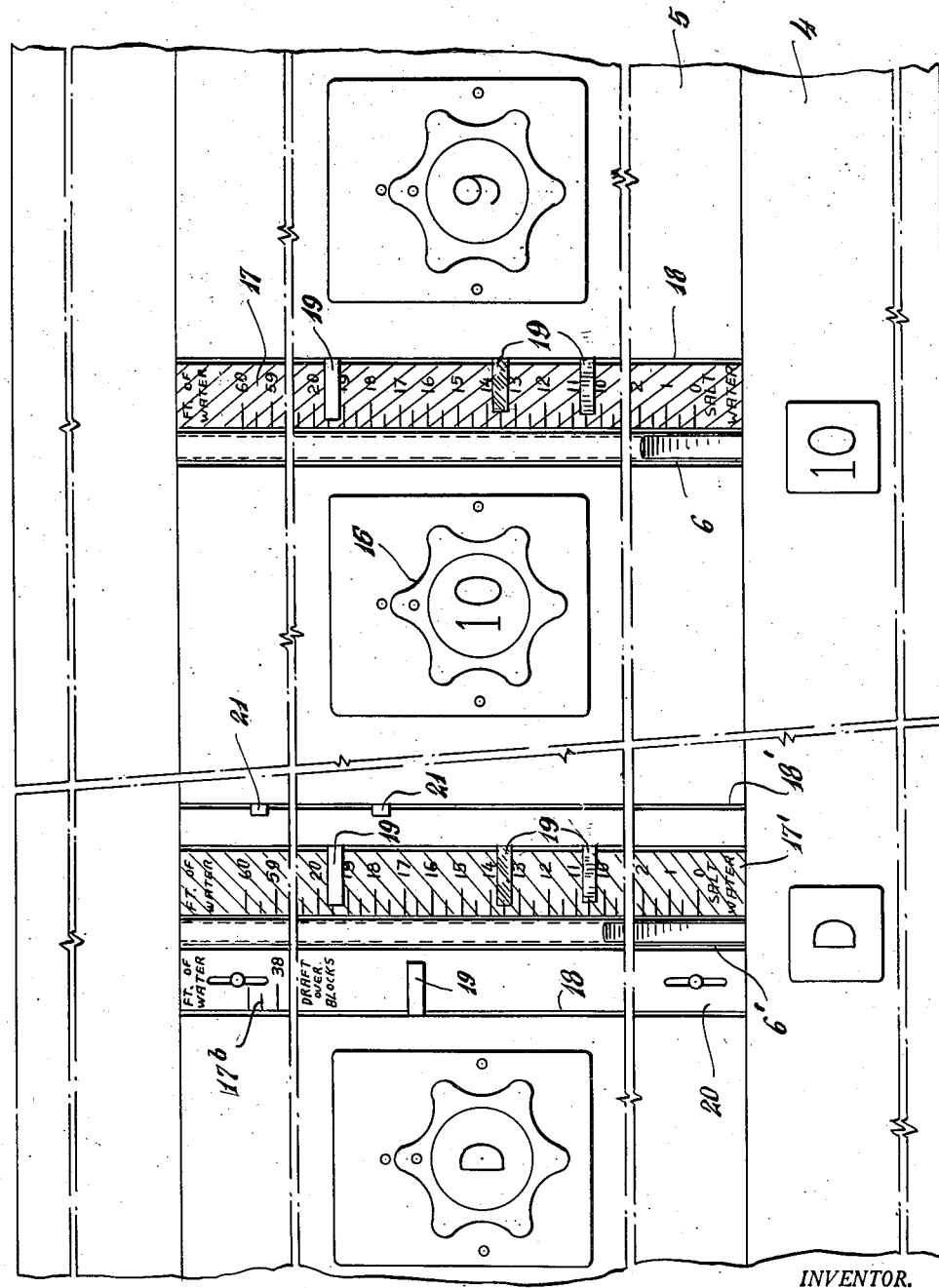

May 24, 1949.   F. R. HARRIS   2,470,850
WATER LEVEL INDICATOR FOR FLOATING DRY DOCKS
Filed Nov. 21, 1945   3 Sheets-Sheet 3
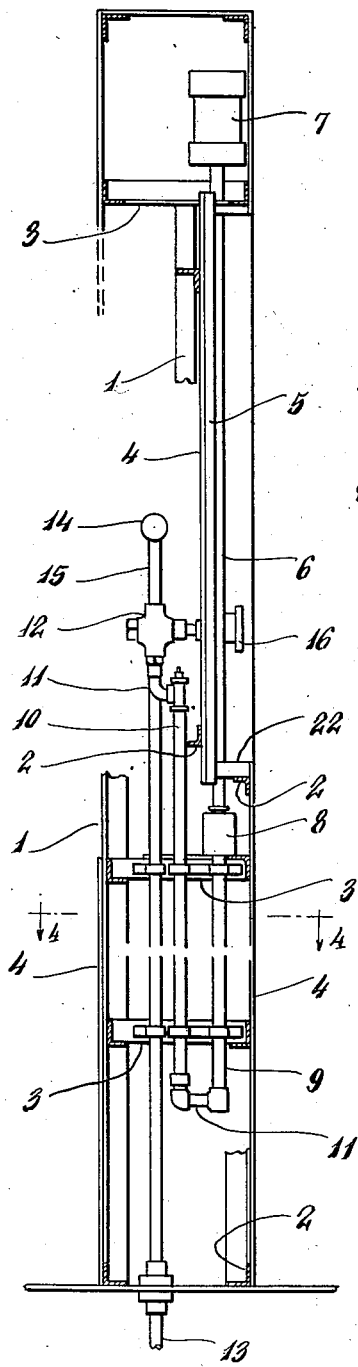
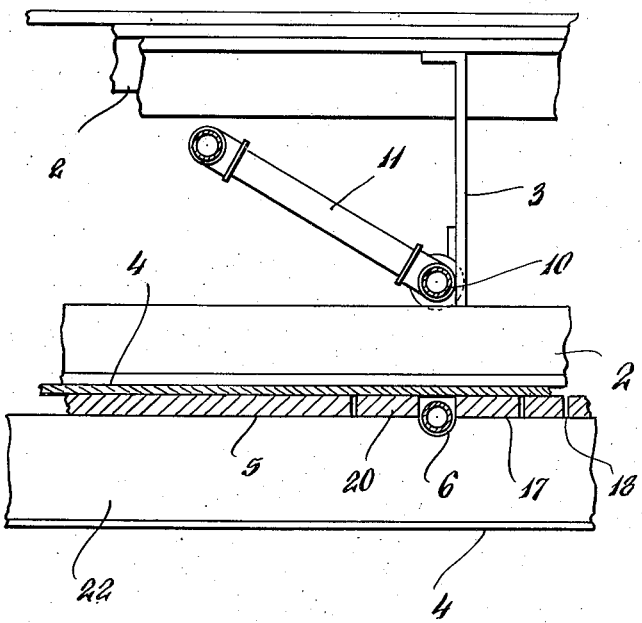
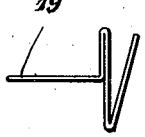
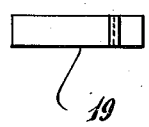
INVENTOR.
Frederic R. Harris
BY
William F. Nickel
ATTORNEY Patented May 24, 1949

2,470,850

UNITED STATES PATENT OFFICE 2,470,850

WATER LEVEL INDICATOR FOR FLOATING DRY DOCKS

Frederic R. Harris, New York, N. Y.

Application November 21, 1945, Serial No. 630,006

11 Claims. (Cl. 114—45)

This invention relates to water level indicators, and more particularly to apparatus for revealing quickly, and in clear and unmistakable fashion, the inside and outside draft at various parts of a floating drydock.

The conventional floating drydock has a pontoon hull and side walls; and its interior is divided into compartments arranged along the sides, each compartment at one side being opposed to a similar compartment at the other. Water is admitted to said compartments, and discharged therefrom as conditions demand. In practice whenever a floating dock is operated to raise a ship out of water, any excessive stresses in the structure of either the ship or the drydock must be avoided. To this end the buoyancy lift of any transverse section of the dock must approximately balance the vertical load imposed upon that particular section. As the weight of the dock is essentially uniform, throughout its length, the imposed load on any part of the dock is determined by the weight of the part of the ship immediately above the aforesaid part or section of the dock. Any difference between this weight and the buoyancy of such part of the dock is balanced by the weight of the water introduced into the ballast compartments. The most convenient way to measure the weight of the water in any compartment of the dock is to ascertain its depth.

For this purpose water level indicators are put up at a central station, such as the control house of the dock, and connected to register the depth of water at all necessary places. Such indicators may be of the dial and movable pointer type; but indicating units such as vertical tubes containing a liquid and working on the principle of the manometer, are more advantageous and desirable. The height of the contained liquid tells the water depth, and a suitable scale gives the reading in feet.

The preferred method of measuring and indicating water depth in any part of the dock is based on the principle of transmitting the pressure due to the static head of the water. This pressure is given by a column of mercury in a tube or other vessel of glass, or the like transparent material. The depth of water in feet is made known on a scale beside the tube.

It is an important object of this invention to provide a water level indicator for a floating drydock, comprising a suitable number of liquid enclosing tubes in a novel combination that will quickly and infallibly make apparent to the eye the level of the water at each of the separate points, inside and outside the dock, where the depth of the water must be watched. The apparatus is generally installed parallel to the main or longitudinal axis of the dock. The tubes are disposed in pairs, side by side, half the members of such pairs being each connected singly and separately to the compartments in succession along one side of the dock, and the other members similarly to the successive compartments along the opposite side; in the same order as the arrangement of the compartments themselves at the sides of the dock. The different members of the pairs thus make two interspersed but well defined sets; and all form a single large row or group. At the extreme ends of the row are located additional tubes for disclosing the outside draft at the opposite ends of the dock. All the tubes are sufficiently close together to be within the field of view. Each tube is conspicuously marked with the number of its associated compartment and the two sets of tubes, one set for each row of compartments along the two sides of the dock, are distinguished from one another by different colors.

By this construction the attendant can see at a glance what are the water levels at all necessary points for any stage in sinking. He can also tell by any difference in the heights of the liquid in the two sets of tubes, if and in what degree the dock is listing sidewise; and, if the tops of the liquid in the tubes of either set show a gradient along the row from end to end thereof, to what extent one end of the dock may be higher in the water than the other; and thus arrive at whatever amount of trim of the dock may be needed.

Prior to the docking or undocking of a ship, a pumping plan is prepared which indicates the required depths of water in the several ballast compartments at five or six stages of the docking or undocking operation. From the pumping plan the appropriate depth of water required in each compartment is posted adjacent to the tubes by means of colored pointers on the scales opposite each of the tubes; for example, the necessary water level in all compartments at stage 1 can be marked by appropriately located red pointers at all gauges; at stage 2 by white pointers, etc. In this manner the docking operation can be carried out by so working the pumps that the water level in each compartment will be at the correct height for each stage of the operation in full accordance with the pumping plan.

Furthermore, if it is desired that the dock shall have a trim at one end, cords are put along the tops of the liquid in the tubes to delineate the slope of the liquid in the units. The amount of trim is then easily perceived.

The nature of the invention is fully described in the accompanying specification and illustrated on the drawings, but the right is reserved to make changes in structural details without alteration of essential characteristics, as set forth in the appended claims:

On said drawings,

Figure 1 shows in outline an indicating apparatus according to this invention.

Figure 2 is a front view of a part thereof on an enlarged scale.

Figure 3 is a transverse vertical section showing the method of mounting and the operating connections for individual indicating units.

Figure 4 is a horizontal section about on the line 4—4 of Figure 3.

Figures 5, 6, 7 and 8 present details; and

Figure 9 is a diagram of the operating connections from the apparatus to the various compartments in the hull of the dock.

The same numerals identify the same parts throughout.

The invention comprises a vertical panel or control board properly mounted on a support having the form of a framework consisting of vertical bars 1, connected by transverse horizontal bars 2 and horizontal bars 3 extending from the front to the back of the framework. Wherever necessary the front and rear of the framework may be covered by steel plates 4. In the framework are mounted sections of fiberboard 5 or the like with intervening spaces for two sets of transparent tubes 6 and 6a. The tubes or units of the two sets are interspersed because the tubes 6 and 6a alternate along the whole length of the row. The tubes are all alike and have numbers as illustrated in Figures 1 and 9. For example, the even numbers on the panel are below the tubes 6; and an odd number on the panel is at the lower end of each of the remaining tubes 6a. The framework may be of any desired construction or design and the details thereof are not part of this invention.

The tubes are of course vertical and are placed side by side and each successive couple of tubes 6 and 6a can be regarded as a separate pair.

The number of each of the tubes on the panel corresponds to the compartment of the dock with which it is connected. Figure 9 represents diagrammatically the plan of the hull of the dock in which the compartments on one side bear odd numbers, from one end of the dock to the other; and the compartments on the other side, in the same order, bear even numbers. The tubes 6a, for instance, having odd numbers at their lower ends, all communicate separately and singly with the compartments having odd numbers, and the alternate tubes 6 having the even numbers communicate in the same manner with the opposite row of compartments having even numbers, on the other side of the dock.

On top of each tube is a reservoir 7 and at the bottom a packing gland 8, which connects the tube to a length of piping 9 extending downward. The lower extremity of pipe 9 is connected with another vertical length of piping 10 by means of a short horizontal piece of piping 11. The sections of pipe 9, 10 and 11 and each of the tubes constitute a manometer; and a liquid, such as mercury, in the tubes will of course rise or fall according to the pressure on one end thereof, in the tube 10.

The upper extremity of each length of piping 10 is connected by a piece of piping 10' to the casing of a four-way valve 12. From the casing of each valve 12 a pipe 13 leads downward to the dock compartment which the particular tube serves, and the top of the casing of each valve 12 is connected to an air header 14 by a pipe 15. Each valve 12 is controlled by a knob 16 on the face of the panel comprising the sections 5, this knob being connected by a stem to the body of the valve inside the casing 12. In one position the pipes 10 and 13 are connected so that the depth of the water in the particular compartment is indicated by the height of the liquid in the tube 6 or 6a. In another position the pipe 10 is cut off by the valve from the pipe 13, and the pipe 13 is put into communication with the pipe 15. Then by means of the compressed air in the reservoir connected to the header 14, each of the lines of pipe 13 can be blown out when necessary. The conditions under which the knobs 16 are operated to throw the valves into position to blow out the pipes 13 need not be detailed herein. The manner in which the pressure is maintained in the piping 13 and caused to operate the mercury in tubes is also not a part of this invention; and any suitable method or devices for establishing the necessary pressure in the pipes 13 and all the manometers may be adopted.

The liquid in the various tubes is pushed up in these tubes by pressure in the pipes 13. These pipes, as stated above, project downward into the various compartments of the dock. The more water in the compartments, the farther down below the level thereof are the lower ends of the tubes 13. The pressure of water below the surface, as is well known, varies directly with increasing depth. The deeper the water in the compartments the more it will rise in the tubes 13 above the lower ends and the greater will be the pressure in the tubes 13 and tubes 6 and 6a; with the result that the level of the liquid in the tubes, through the action of the pressure in the tubes 13, indicates the depth of the water in the compartments of the dock.

My invention relates primarily to the arrangement of the tubes and the visual effect which these tubes and the liquid therein are capable of giving. At the right of each of the tubes 6 and forming part of the fiberboard front of the panel is a vertical strip 17, the face of which bears a scale with graduations indicating depth of water in feet according to the height which the column of liquid reaches in the tube next to said scale; see Figure 2, and similar strips 17a provide scales for the tubes or units 6a. Also beside each scale is a vertical groove 18 in the fiberboard panel to receive an element or pointer 19. Each pointer can slide up and down in its slot 18, and can be moved into a position flush with the top of the column of liquid in the adjacent tube. To distinguish the scales of the tubes for the starboard compartments from the scales for the tubes of the port compartments, the strips 17 and 17a may be of different colors. One set may be green, for example, and the other brown, or any other easily distinguishable colors may be adopted. Then the liquid in the tubes adjacent the brown scales will indicate the level of the water in the compartments on the port side and the liquid in the tubes adjacent the scales of a different color will similarly indicate the depth of the water in the compartments on the starboard side. The condition of the various compartments of the dock and the height of the water level in each will thus be infallibly indicated to the observer, without risk of error.

At the ends of the rows of tubes 6 and 6a are additional tubes 6' besides which are similar scale bearing parts 17'. There will also be slots 18 beside each of the scale bearing parts 17' for pointers 19. The height of the liquid in the tubes 6' shows the outside draft at the two ends of the dock, and the scales show the same in feet. The knobs for the tubes 6' are therefore designated by the letter D. There may be a pair of tubes 6' at each end of the panel, one for each corner of the dock at that end, although only one is shown in the drawings. Also, an additional vertical groove 18' is provided at the two ends of the control board. Each of these grooves 18' receives a pair of elements or markers 21. Thus, there will be two markers at the left-end of the row of tubes and two at the right-end. In preparing the empty dock to receive or discharge a ship with a list or a trim (or both a list and trim) it is desirable to establish the depths of ballast water in the several compartments at different predetermined levels. To accomplish this easily, at the left end a marker will be adjusted to the desired height of the level of the liquid in the adjacent tube 6a of the set for the compartments at one side of the dock; and at the opposite end of the control board a marker will be set at the desired height of the level in the last tube 6a for the same side of the dock. These two markers will be joined by a wire or string indicated at 22, which will run along the tops of the mercury columns in the tubes 6a. The same procedure will be followed for the other set of tubes 6; a string 23 is stretched from the other two markers 21, one at each end of the panel, to mark the level of the mercury desired in the tubes 6, and the difference between the heights of these two strings will be a measure of the difference in ballast on the two sides of the dock and will therefore indicate an amount of list. At the same time, the slope or gradient of these two cords or strings will indicate the difference in ballast weight distributed along the axis of the dock and will therefore indicate the amount of trim. In this way, the condition of the ballast water at all points in the dock will always be made clear.

In Figure 2 several pointers 19 are shown for each of the scales. The pointers are all of different colors, each set of one color showing the desired level of water in the dock compartments for one stage of operation as described above. It is understood that several such pointers 19 of different colors are inserted in the grooves 18 of every scale 17 and 17a, although, for convenience and clearness the pointers do not appear in Figure 1. The same number of different colored pointers may also be used with the end tubes 6'.

If the dock needs trim at one end, the operation is conducted accordingly till the strings 22 and 23 show the gradient desired. If the dock is to have a list, all compartments on one side of the dock are flooded with more water than the compartments on the other side. This difference in the height of the mercury columns in the two sets of tubes indicated by the two strings 22 and 23 stretched across the front of the board will show the estimated depths of ballast water required to produce the desired list. The depths of ballast water can be adjusted till the desired list is actually reached.

Besides each of the tubes 6' is an additional scale 17b, with a groove 18 and pointer 19 to show the draft over the keel blocks on the deck of the dock to engage the ship's bottom. This scale may be vertically adjustable by means of a screw-and-slot mounting 29.

It is understood, of course, that, in Figure 9, the parts 6 and 6a show the mercury columns in the various tubes, rather than the tubes themselves; a full appearance of the tubes in this view being unnecessary. In this figure, the connections including pipes 13 for the tubes 6' are included at the ends.

My invention can of course be used in various constructions besides floating dry docks to indicate the level of liquid in different compartments or parts.

Having described my invention, what I claim is:

1. Indicator apparatus for a floating dry dock having a hull with interior compartments along both sides, each compartment on one side being opposed to a compartment on the other; a row of tubes each containing a liquid, a support for holding said tubes relatively close together in one field of view; said tubes being mounted side by side in pairs, and connections for transmitting pressure to the liquid in each tube, said connections extending singly and separately from one tube of each pair to the compartments in succession at one side of the dock and from the other tube of each pair in the like order and succession to the compartments along the other side of the dock.

2. Indicator apparatus for a floating dry dock having a hull with interior compartments along both sides, each compartment on one side being opposed to a compartment on the other; a row of tubes each containing a liquid, a support for holding said tubes relatively close together in one field of view; said tubes being mounted side by side in pairs, connections for transmitting pressure to the liquid in each tube, said connections extending singly and separately from one tube of each pair to the compartments in succession at one side of the dock and from the other tube of each pair in the like order and succession to the compartments along the other side of the dock, and vertically movable markers on said support adjacent the ends of said row.

3. Indicator apparatus for a floating dry dock having a hull with interior compartments, along both sides, each compartment on one side being opposed to a compartment on the other; a row of tubes each containing a liquid, a support for holding said tubes relatively close together in one field of view; said tubes being mounted side by side in pairs, and connections for transmitting pressure to the liquid in each tube, said connections extending singly and separately from one tube of each pair to the compartments in succession at one side of the dock and from the other tube of each pair in the like order and succession to the compartments along the other side of the dock, said support comprising scale-bearing parts adjacent each tube and vertical slots in proximity to said parts, and movable pointers in the slots to register with the tops of the liquid in said tubes.

4. Indicator apparatus for a floating dry dock having a hull with interior compartments, a group of tubes each containing a liquid, a support for mounting said tubes relatively close together in one field of view, connections for transmitting pressure to the liquid in each tube, and extending singly and separately from each tube to one of said compartments, vertically movable markers on the support adjacent the extermities of said group and additional liquid-containing tubes adjacent said extremities to measure the outside draft of the ends of the dock.

5. Indicator apparatus for a floating dry dock having a hull with interior compartments along both sides, each compartment on one side being opposed to a compartment on the other; a row of tubes each containing a liquid, a support for holding said tubes relatively close together in one field of view; said tubes being mounted side by side in pairs, connections for transmitting pressure to the liquid in each tube, said connections extending singly and separately from one tube of each pair to the compartments in succession at one side of the dock and from the other tube of each pair in the like order and succession to the compartments along the other side of the dock and additional liquid-containing tubes at the ends of said row to measure the outside draft at the ends of said dock.

6. Indicator apparatus for a floating dry dock having a hull with interior compartments along both sides, each compartment on one side being opposed to a compartment on the other; a row of tubes each containing a liquid, a support for holding said tubes relatively close together in one field of view; said tubes being mounted side by side in pairs, connections for transmitting pressure to the liquid in each tube, said connections extending singly and separately from one tube of each pair to the compartments in succession at one side of the dock and from the other tube of each pair in the like order and succession to the compartments along the other side of the dock, vertically movable markers at the extremities of said row, and additional liquid-containing tubes adjacent said extremities to measure the outside draft at the ends of the dock.

7. Indicator apparatus for a floating dry dock having a hull with interior compartments along both sides, each compartment on one side being opposed to a compartment on the other; a row of tubes each containing a liquid, a support for holding said tubes relatively close together in one field of view; said tubes being mounted side by side in pairs, connections for transmitting pressure to the liquid in each tube, said connections extending singly and separately from one tube of each pair to the compartments in succession at one side of the dock and from the other tube of each pair in the like order and succession to the compartments along the other side of the dock, said support comprising scale-bearing parts adjacent each tube and vertical slots in proximity to said parts, with movable pointers in said slots to register with the tops of the liquid in said tubes, and additional liquid-containing tubes adjacent said extremities to measure the outside draft at the ends of the dock.

8. Indicator apparatus for a floating dry dock having a hull with interior compartments along both sides, each compartment on one side being opposed to a compartment on the other, a row of tubes each containing a liquid, a support for holding said tubes relatively close together in one field of view, said tubes being mounted side by side in pairs, said tubes thus being divided into two sets, one of which embraces one member of each pair and the other the remaining members, connections for transmitting pressure to each tube, said connections extending singly and separately from one tube of each pair to the compartments in succession at one side of the dock and from the other tube of each pair in the like order and succession to the compartments along the other side of the dock, said support having vertical slots at each end of the row of tubes, and a movable marker for each set of tubes in each of said slots, the line across the support between the markers of each set registering with the top of the liquid in the tubes thereof.

9. Indicator apparatus for a floating dry dock having a hull with interior compartments, according to claim 8, which also has additional liquid-containing tubes and scale-bearing parts at the extremities of said row to measure the outside draft at the ends of the dock.

10. Indicator apparatus for a floating dry dock having a hull with interior compartments, a group of tubes each containing a liquid, a support for mounting said tubes relatively close together in one field of view, and connections for transmitting pressure to the liquid in each tube, and extending singly and separately from each tube to one of said compartments, said apparatus having vertical markers on the support at the ends of the group, the positions of the markers showing the level of the tops of the liquid in said tubes.

11. Indicator apparatus for a floating dry dock having a hull with interior compartments, a group of tubes each containing a liquid, mounted relatively close together in one field of view, connections for transmitting pressure to the liquid in each tube and extending separately and singly from each tube to one of said compartments and a set of markers for each tube, the markers of each set being of different appearance and the corresponding markers of the sets being of the same appearance, so that the corresponding markers can be placed in position to designate the water levels in the compartments at various stages in the docking operation.

FREDERIC R. HARRIS.

REFERENCES CITED

The following references are of record in the file of this patent:

UNITED STATES PATENTS

| Number | Name | Date |
|---|---|---|
| 685,164 | Morris | Oct. 22, 1901 |
| 1,333,580 | Ximenez | Mar. 9, 1920 |
| 1,428,363 | Dreiske | Sept. 5, 1922 |
| 1,917,846 | Klopsteg | July 11, 1933 |
| 2,379,685 | Crandall | July 3, 1945 |
| 2,379,902 | Harris | July 10, 1945 |

FOREIGN PATENTS

| Number | Country | Date |
|---|---|---|
| 322,471 | Germany | June 30, 1920 |